July 11, 1967

G. K. NEWELL 3,330,387

RAILWAY CAR TRUCK BRAKE APPARATUS

Filed Dec. 27, 1965

INVENTOR.
GEORGE K. NEWELL
BY
*a. a. Steinmiller*
ATTORNEY

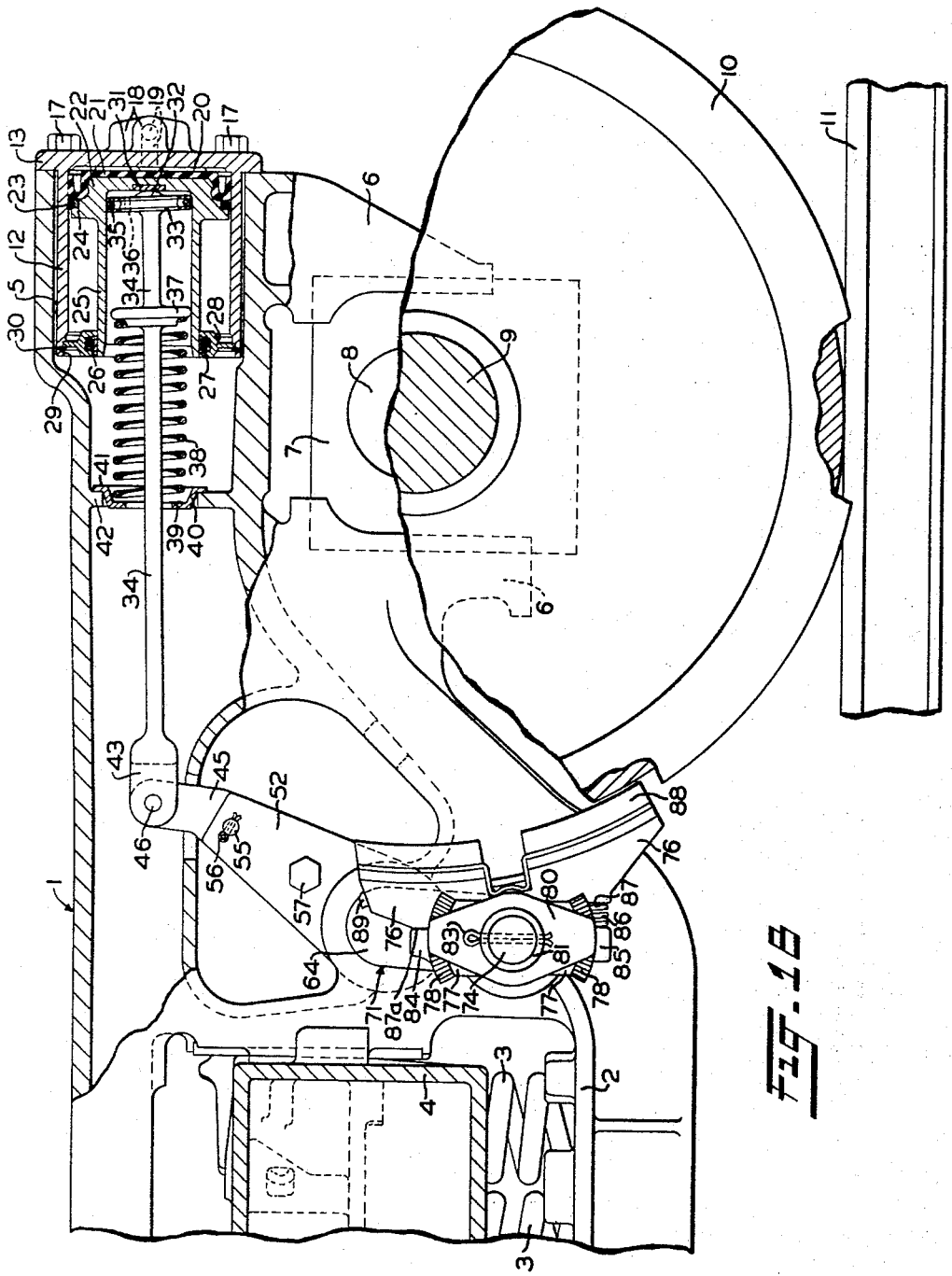

July 11, 1967 G. K. NEWELL 3,330,387
RAILWAY CAR TRUCK BRAKE APPARATUS
Filed Dec. 27, 1965 7 Sheets-Sheet 3
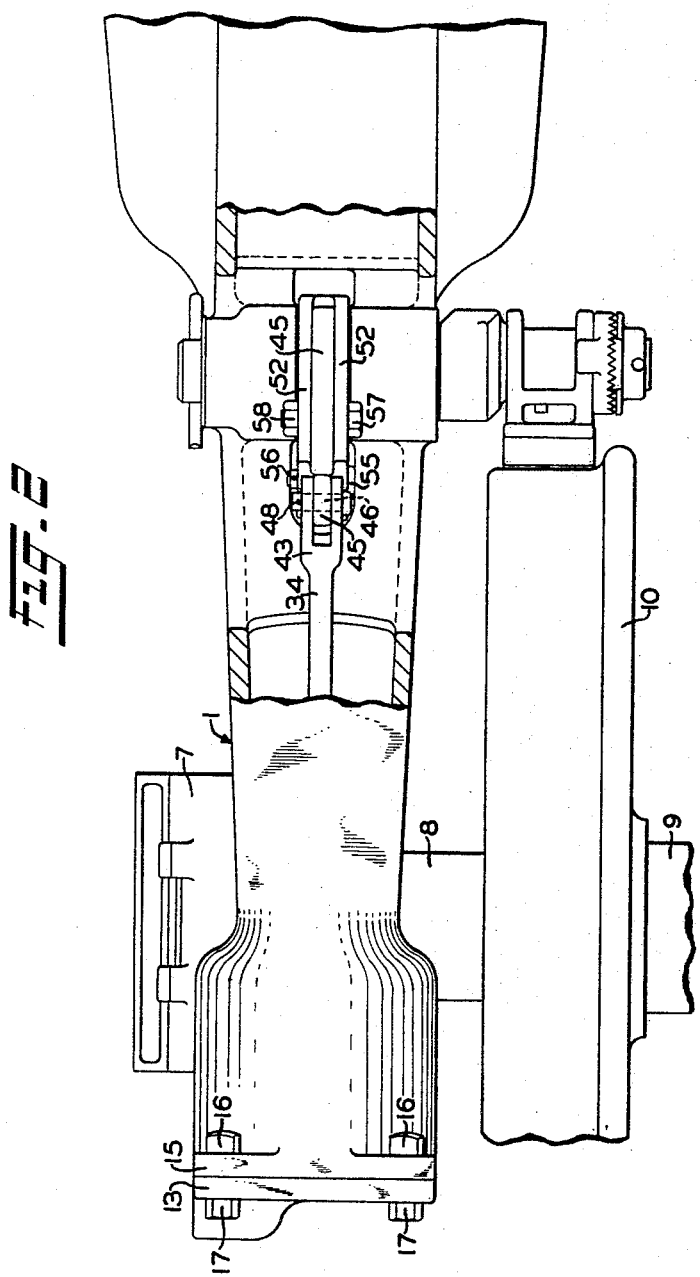
INVENTOR.
GEORGE K. NEWELL
BY
*A. A. Steinmiller*
ATTORNEY July 11, 1967  G. K. NEWELL  3,330,387
RAILWAY CAR TRUCK BRAKE APPARATUS
Filed Dec. 27, 1965  7 Sheets-Sheet 4
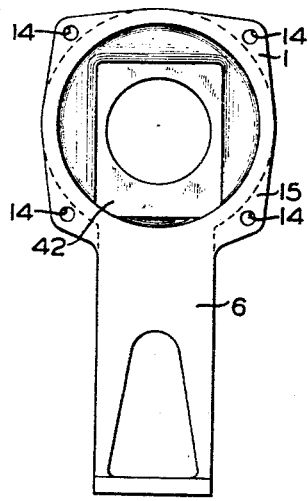
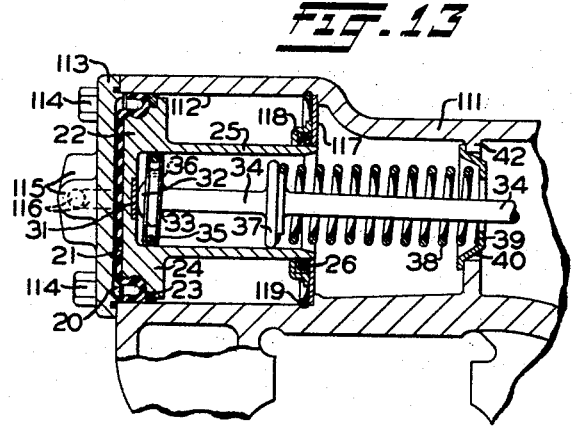
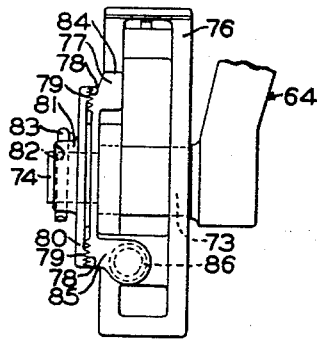
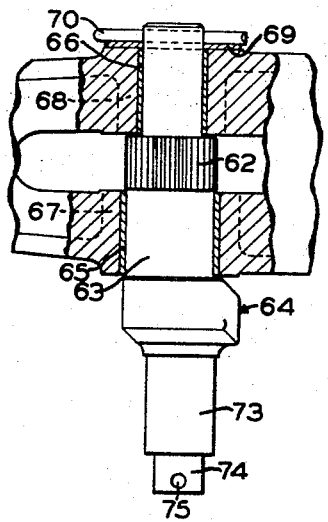
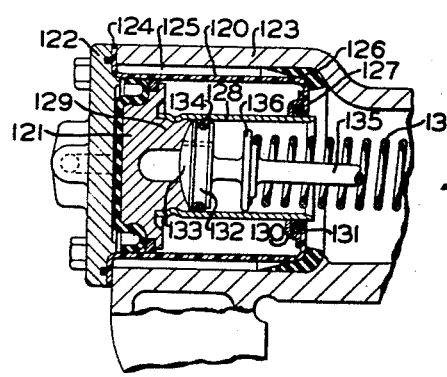
INVENTOR.
GEORGE K. NEWELL
BY
*a. a. Steinmiller*
ATTORNEY July 11, 1967

G. K. NEWELL 3,330,387

RAILWAY CAR TRUCK BRAKE APPARATUS

Filed Dec. 27, 1965

INVENTOR.
GEORGE K. NEWELL
BY
ATTORNEY

July 11, 1967 G. K. NEWELL 3,330,387
RAILWAY CAR TRUCK BRAKE APPARATUS
Filed Dec. 27, 1965 7 Sheets-Sheet 7

INVENTOR.
GEORGE K. NEWELL
BY
*A. A. Steinmiller*
ATTORNEY

United States Patent Office 3,330,387
Patented July 11, 1967

3,330,387
RAILWAY CAR TRUCK BRAKE APPARATUS
George K. Newell, Penn Township, Westmoreland County, Pa., assignor to Westinghouse Air Brake Company, Wilmerding, Pa., a corporation of Pennsylvania
Filed Dec. 27, 1965, Ser. No. 516,588
10 Claims. (Cl. 188—153)

This invention relates to a railway car truck rigging and, more particularly, to a brake rigging wherein the actuating mechanism or brake cylinder device is embodied within a railway car truck side frame and, in operation, transmits a braking force to the tread surface of a truck wheel through a linkage including a brake lever supported entirely on the truck side frame.

In recent years various proposals have been made to provide a simplified form of brake rigging for railway freight cars. Some of these proposals have actually been built and placed in service on a number of railroads. However, modern high speed freight cars being constructed today are of constantly increasing weight and length. Accordingly, these new freight cars require heavier and deeper center sills which reduce and cramp the space between the car wheels in which the usual car brake rigging is placed. Therefore, it becomes quite difficult, if not impossible, to apply some of the proposed brake riggings to modern high speed freight cars. In any event, there are limitations on the applicability of existing brake riggings to the wheel trucks of modern freight cars.

The present invention has for its object the provision of a new and improved form of brake rigging for railway freight cars which entirely eliminates the danger of damage to parts of the brake rigging, to which parts of the conventional rigging are subject, by housing the more vulnerable members of the rigging including the brake cylinder device within the car truck side frame, thereby affording the rigging protection against damage, as by flying ballast. Furthermore, by housing the brake rigging within the car truck side frame, there is less likelihood of a derailment should breakage of certain members of the rigging occur than would be the case with conventional brake rigging.

More specifically, this invention comprises a novel railway car truck side frame that is cylindrical or tubular in cross section at each end forming therein a body for a brake cylinder device the piston of which has a piston rod pivotally connected to one end of a sectionalized brake lever the opposite end of which is operatively connected to a brake-head-carrying crank member that is rockably mounted between a pair of spaced aligned bosses formed integral with the truck side frame.

The invention further includes a novel hand brake mechanism associated with one or both truck side frames for manually applying a braking force to the corresponding wheels. This hand brake mechanism comprises a hand brake lever formed integral with one of the two brake-head-carrying crank members and connected by a link to a horizontally disposed floating lever intermediate the ends thereof. One arm of this floating lever on one side of its pivotal connection with the link extends through a slot formed in the truck side frame and is connected by means of a clevis to the brake lever removably secured to the other brake-head-carrying crank member. The end of the other arm of this floating lever which extends toward the center of the car truck, is connected by some suitable means such as a pull rod to a hand brake chain or cable or to one end of an equalizing lever which is connected at its other end to a corresponding hand brake mechanism for the other side of the truck, it being understood that the hand brake chain or cable is connected to this equalizing lever substantially midway its ends for effecting simultaneous manual operation of the two hand brake mechanisms for the two opposite sides of the car truck.

According to the present invention, the location of the members of the brake rigging within the car truck side frame not only affords protection to these members aginst damge but also places them in a position easily accessible to railway personnel so that all required inspections and normal servicing such as, for example, lubrication can be made without the necessity of an inspector or a repairman entering the area between the rails of the track. Furthermore, replacement of worn out brake shoes can be likewise made by the repairman while standing alongside of the track.

Moreover, since in the present invention all elements of the brake rigging have been removed from the space between the wheels on opposite sides of the railway car truck, this space becomes available for use by car builders to increase the strength and size of car center sills or other truck members.

It will be seen that in the present invention as a result of the protection inherently afforded the various brake rigging members by being enclosed within the truck side frame, members of minimum weight consistent with strength requirements to transmit the necessary force to effect a braking action on a wheel of a car truck may be employed in this rigging. Also, it is contemplated that the brake rigging constituting the present invention effects a reduction in respect to the weight of the conventional rigging estimated at from five hundred to a thousand pounds.

In the accompanying drawings:

FIGS. 1A and 1B, when taken together such that the righthand edge of FIG. 1A is matched with the left-hand edge of FIG. 1B, constitutes an elevational view of one side of a railway car truck, looking from a point inboard of the wheels outwardly, showing two brake cylinder devices carried by the side frame on the one side of the truck, each brake cylinder device being operatively connected to a corresponding brake applying linkage through which a braking force is transmitted to the tread surface of one of the two car wheels on the one side of the truck.

FIG. 2 is a plan or top view of one-half of the truck side frame shown in FIGS. 1A and 1B with part of the top of the truck side frame broken away to show the brake applying linkage carried therein.

FIG. 3 is a left-hand end elevational view of the truck side frame shown in FIGS. 1A and 1B with the brake cylinder device removed to show a plurality of bores provided in the end of the side frame for receiving a corresponding number of bolts by which the pressure head of a brake cylinder device is secured to the truck side frame.

FIG. 4 is an end elevational view of a brake-shoe-carrying brake head and a portion of a brake head crank on which the brake head is pivotally mounted.

FIG. 5 is a cross-sectional view, taken along the line 5—5 of FIG. 1A, and looking in the direction of the arrows, showing the manner by which a brake head crank is rotatably mounted on a truck side frame.

FIG. 13 is a vertical cross-sectional view of a second embodiment of the invention in which the side frame constitutes the body of a brake cylinder device.

FIG. 14 is a vertical cross-sectional view of a third embodiment of the invention showing a brake cylinder device carried by and within a side frame, the cylinder body of this brake cylinder device being constructed of reinforced plastic and separate from a pressure head that is secured to the side frame.

Description

Figure 1A:
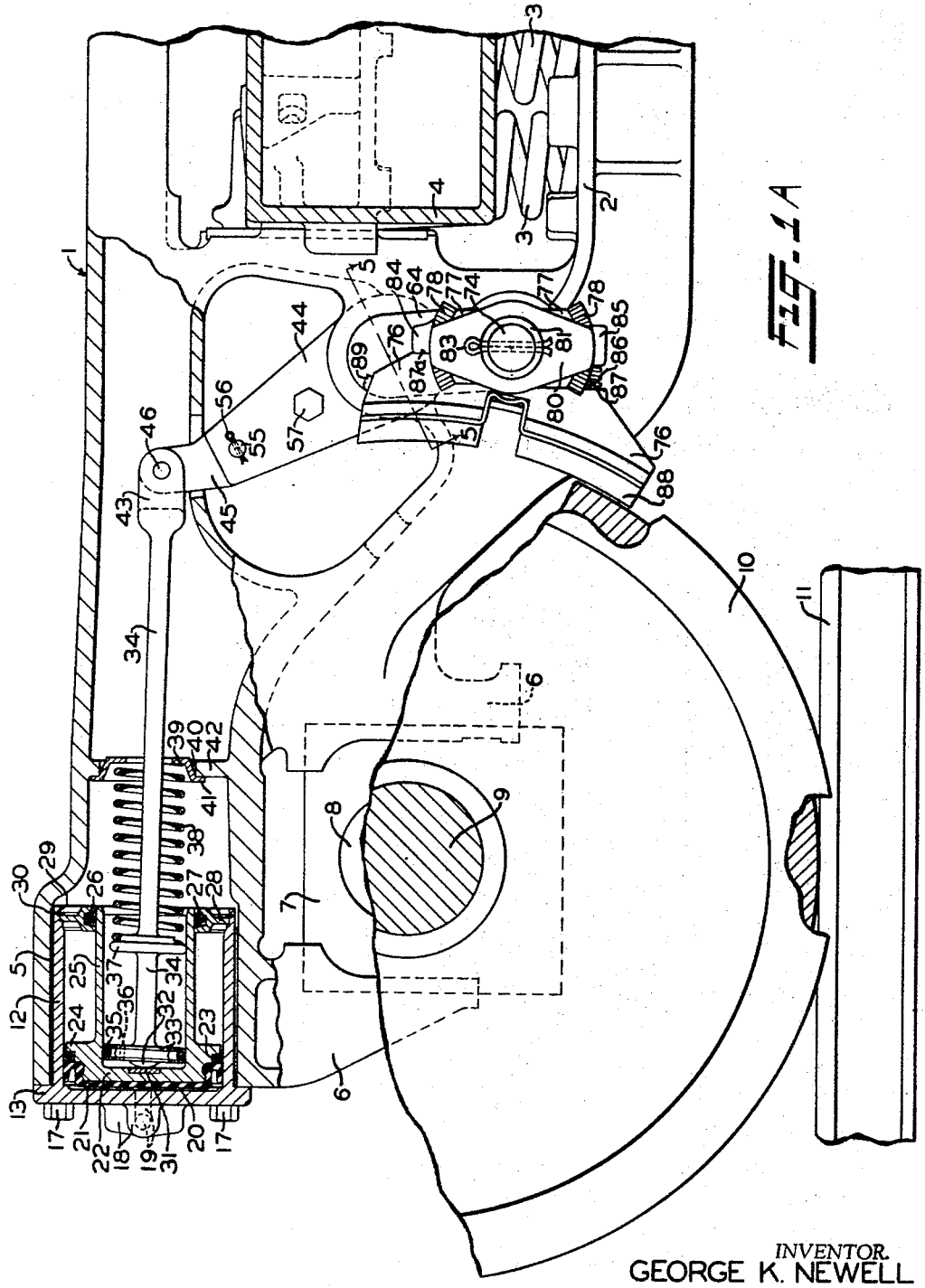

FIGS. 1A and 1B of the drawings show, when the right-hand edge of FIG. 1A is matched with the left-hand edge of FIG. 1B, a railway car truck that has two identical side frames 1, only one of which appears in FIGS. 1A and 1B. Each side frame 1 is provided with a truck spring plank 2 integral therewith for supporting a plurality of springs 3 upon which rests one end of a truck bolster 4 that in turn supports one end of a center sill (not shown) of a railway car body (not shown).

According to the first embodiment of the present invention, the truck side frame 1 has formed therein adjacent each of its ends a substantially cylindrical elongated cavity 5 for receiving therein a brake cylinder device hereinafter described in detail. Substantially below each of the elongated cavities 5, the corresponding end of the side frame 1 has formed integral therewith a pair of downwardly extending spaced-apart grooved pedestals 6 between which is received a corresponding journal box 7. Each journal box 7 has rotatably mounted therein a corresponding journal 8 formed at one end of a car axle 9. Each car axle 9 has mounted thereon on the inboard side of each journal 8 a car wheel 10 only one of which appears in the drawings. Each car wheel 10 in turn is supported by one rail 11 of a railway track upon which the railway car truck travels.

The brake cylinder devices carried in the side frame 1 are identical and each is operatively connected through a brake actuating linkage to a brake-shoe-carrying brake head, the shoe of which is forced thereby into braking contact with the tread surface of a corresponding wheel of the truck in response to the simultaneous supply of fluid under pressure to the brake cylinder devices. Since the two brake cylinder devices and the two actuating linkages are identical, a description of one will suffice for both. Accordingly, the various elements of each brake cylinder device and each actuating linkage are denoted by the same reference numeral.

As shown in FIGS. 1A and 1B, each brake cylinder device comprises a cup-shaped brake cylinder body 12 which is open at one end and provided with an integral out-turned flange 13 at the opposite end. The flange is provided with a plurality of arcuately spaced-apart bores (not shown) which, when the body 12 is centrally disposed in the corresponding cavity 5 in the truck side frame 1, are in alignment with a corresponding number of bores 14 (FIG. 3) formed in a flange 15 that is integral with the respective end of the side frame 1 whereby the flange 13 can be secured to the side frame 1 by a plurality of bolts 16 and nuts 17 (FIG. 2) each of which bolts extends through a bore (not shown) in the flange 13 and a corresponding bore 14 (FIG. 3) in the flange 15.

As shown in FIGS. 1A and 1B of the drawings, the out-turned flange 13 has formed integral therewith a boss 18 through which extends a passageway 19 that opens at one end into a pressure chamber 20 formed between the closed end of the body 12 and a packing cup 21 secured to a piston 22 slidably disposed in the body 12. The opposite end of the passageway 19 opens at a bolting face (not shown) on the boss 18 to which a flange fitting (not shown) may be secured. A pipe (not shown) may have one end connected to this flange fitting and the opposite end connected to the brake cylinder passageway of the usual brake control valve device provided on railway cars for controlling the brakes thereon. Therefore, fluid under pressure may be supplied from the brake control valve device to the chamber 20 through this pipe and the passageway 19 to cause a brake application in a manner hereinafter described in detail.

In order to prevent hammering of the piston 22 in the bore of the body 12, the piston 22 is supported by a resilient support ring 23 which is carried by the piston and disposed between a flange 24 formed on the piston and the packing cup 21 secured thereto.

Extending from that side of the piston 22, opposite the side thereof to which the packing cup 21 is secured, is a sleeve 25, the outer end of which extends through a dust excluding ring 26 which may be made of some suitable material such as, for example, felt, to which a lubricant may be periodically applied. The ring 26 is disposed in an internal groove 27 formed in an annular member 28 disposed in a counterbore 29 extending inward from the open end of the body 12. The member 28 is retained against a shoulder formed by the end of the counterbore 29 by a snap ring 30 inserted in a groove in the wall surface of this counterbore.

The piston 22 is provided with a wear plate 31 against which rests a knob 32 formed on one side of an annular member 33 integral with one end of a push rod 34 and disposed within the sleeve 25. The member 33 is provided with a peripheral annular groove in which is disposed a resilient O-ring 35 that contacts the interior wall surface of the sleeve 25 and acts as a cushion to prevent wear. Member 33 is also provided with a bore 36, the purpose of which is to prevent dashpot action when initially assembling the push rod 34 within the sleeve 25.

Also disposed within the sleeve 25 and formed integral with the push rod 34 intermediate the ends thereof is a second annular member 37 against which rests one end of a brake cylinder release spring 38. The opposite end of the spring 38 rests against an inturned flange 39 formed on an annular spring seat 40 that also has formed integral therewith an out-turned flange 41 that is biased by the spring 38 against an annular inturned flange 42 integral with the side frame 1. This construction provides for the easy removal of the brake cylinder body 12, piston 22, sleeve 25, and annular member 28 as a unit without interference by the spring 38 since this spring will remain undisturbed and effective to maintain the brakes released via the push rod 34 against which the spring 38 acts.

The opposite end of the piston rod 34 has formed integral therewith a clevis 43 which is operatively connected to one end of a two-part brake cylinder lever now to be described. This two-part lever comprises a crank end member 44 shown in detail in FIGS. 7 and 8 of the drawings and a push rod end member 45 shown in detail in FIGS. 9 and 10.

The upper end of the push rod end member 45 is disposed between the jaws of the clevis 43 and is pivotally connected thereto as by means of a headed pin 46 (FIG. 2) which extends through a bore 47 (FIGS. 9 and 10) provided in the upper end of the member 45 and coaxial bores in the jaws of the clevis 43, and a cotter pin 48 (FIG. 2) that is disposed in a bore adjacent the end of the pin 46 opposite the headed end thereof.

Figure 7:
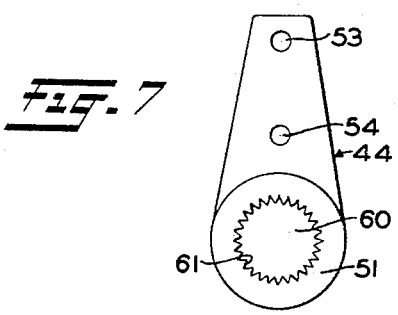
FIG. 7 is a front elevational view of that portion of a two-part brake cylinder lever that is mounted on the brake head crank.
Figure 8:
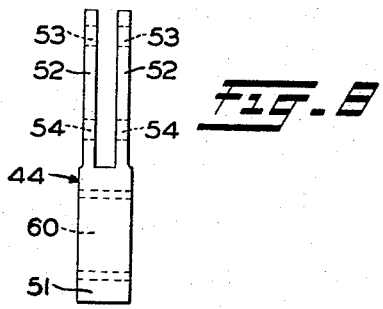
FIG. 8 is a side elevational view of that portion of a two-part brake cylinder lever that is shown in FIG. 7.
Figure 9:
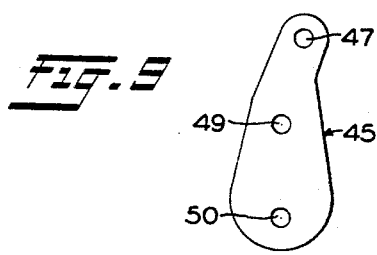
FIG. 9 is a front elevational view of that portion of a two-part brake cylinder lever that is pivotally connected to the exterior end of the piston rod of a brake cylinder piston.
Figure 10:
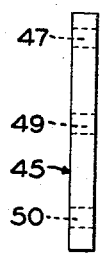
FIG. 10 is a side elevational view of that poriton of a two-part brake cylinder lever that is shown in FIG. 9.

As shown in FIGS. 9 and 10, the member 45 is provided with two spaced-apart parallel bores 49 and 50. As shown in FIGS. 7 and 8, the member 44 comprises a hub portion 51 from which extends two identical, parallel, spaced-apart arms 52, each of which is provided with a pair of spaced-part parallel bores 53 and 54, the spacing of the bores 53 and 54 in the arms 52 being identical to the spacing of the bores 49 and 50 in the push rod end member 45. The member 45 is disposed between the spaced-apart arms 52 of the member 44 with the bores 49 and 50 in the member 45 coaxial respectively with the bores 53 and 54 in the arms 52 of the member 44 so that the member 45 may have a semi-permanent and rockable connection with the member 44 by means of a headed pin 55 (FIG. 2) that extends through the bores 53 (FIG. 8) in the arms 52 of the member 44 and the bore 49 (FIG. 10) in the member 45 and a cotter pin 56 (FIG. 2) that is disposed in a bore adjacent the end of the pin 55 opposite the headed end thereof, and by means of a rivet or a bolt 57 that extends through the bores 54 (FIG. 8) in the arms 52 and the bore 50 (FIG. 10) in the member 45 and a nut 58 (FIG. 2). The push rod end member 45 and the crank end member 44 when so connected form a sectionalized or two-part brake cylinder lever which is mounted on a brake-head-carrying crank which will now be described in detail.

Figure 6:
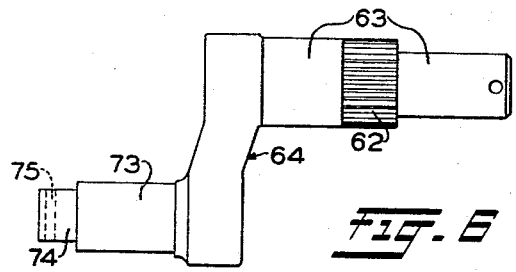
FIG. 6 is a side elevational view of the brake head crank showing further structural details not made apparent in FIGS. 4 and 5.

The hub portion 51 of member 44 of each two-part brake cylinder lever shown in FIGS. 1A and 1B of the drawings is provided with a bore 60 (FIG. 7) in which is produced, as for example, by broaching, internal splines 61. Fitted into the splined bore 60 of the hub portion 51 of the member 44 shown in FIG. 1A are external splines 62 (FIG. 6) formed, as for example, by milling, on a shaft 63 that extends from one side of a first brake head crank 64. As shown in FIGS. 5 and 6 of the drawings, the splines 62 are formed intermediate the ends of the shaft 63 and between two portions of unequal diameter which respectively extend, with a turning fit, through two sleeve-type bearings 65 and 66 (FIG. 5) that are press-fitted into coaxial bores in a pair of oppositely extending bosses 67 and 68 formed integral with the vertical spaced-apart sides of the side frame 1. The shaft 63 is retained in the bearings 65 and 66 by a washer 69 and a cotter pin 70 as shown in FIG. 5. A second brake head crank 71, which appears only in FIGS. 1B, 11 and 12 of the drawings, differs from the first brake head crank 64 only in that it is provided with an integral hand brake lever arm 72 (FIGS. 11 and 12) for a hand brake mechanism hereinafter described in detail. These brake head cranks 64 and 71 are each provided with a break-head-carrying shaft 73 and a shaft extension 74 that is provided with a bore 75, the axis of which is at a right angle to and intersects the axis of the shaft extension 74.

As shown in FIG. 4 of the drawing, a brake head 76 is mounted on the shaft 73 of each of the brake head cranks 64 and 71. Each brake head 76 is retained and positioned on the shaft 73 of the corresponding brake-head-carrying crank by an inner plate member 77 that has a central bore to enable it to be mounted on the shaft extension 74. The inner plate member 77 is substantially rectangular in shape and on one side thereof adjacent its upper and lower ends is provided with an arcuately extending serrated or toothed portion 78 each of which engages a corresponding but shorter arcuately extending serrated or toothed portion 79 provided on one side of an outer plate member 80 that likewise has a central bore to enable it to be mounted on the shaft extension 74. Formed on the other side of the member 80 is a boss 81 that is provided with a bore 82 to enable this outer plate member 80 to be retained on the shaft extension 74 by means of a cotter pin 83 that extends through this bore 82 and the bore 75 in the shaft extension 74.

The member 77 is also provided at its upper end with a stop lug 84 and at its lower end with a cup-like spring seat 85. A spring 86 has one end disposed in the cup-like spring seat 85 and its opposite end abutting a flat surface 87 (FIGS. 1A and 1B) formed adjacent the lower end of the brake head 76. The spring 86 therefore exerts a thrust on the inner plate member 77 to bias the stop member 84 integral therewith against a flat surface 87a formed adjacent the upper end of the brake head 76. This construction provides for limited rocking of the brake head 76 about the brake-head-carrying shaft 73 against the yielding resistance of the spring 86. A brake shoe 88 is secured to each brake head 76 as by a key 89.

This adjustable brake head positioning means is essential in order that when assembling the brake head 76 upon the brake-head carrying shaft 73 of the brake head crank, the brake head 76 and brake shoe 88 carried thereon may be positioned parallel with the tread surface of the wheel and locked in this position by means of the toothed outer plate 80. This adjustment only needs to be made when initially assembling the brake rigging or when the truck wheels are replaced by wheels of a slightly different diameter.

Figure 11:
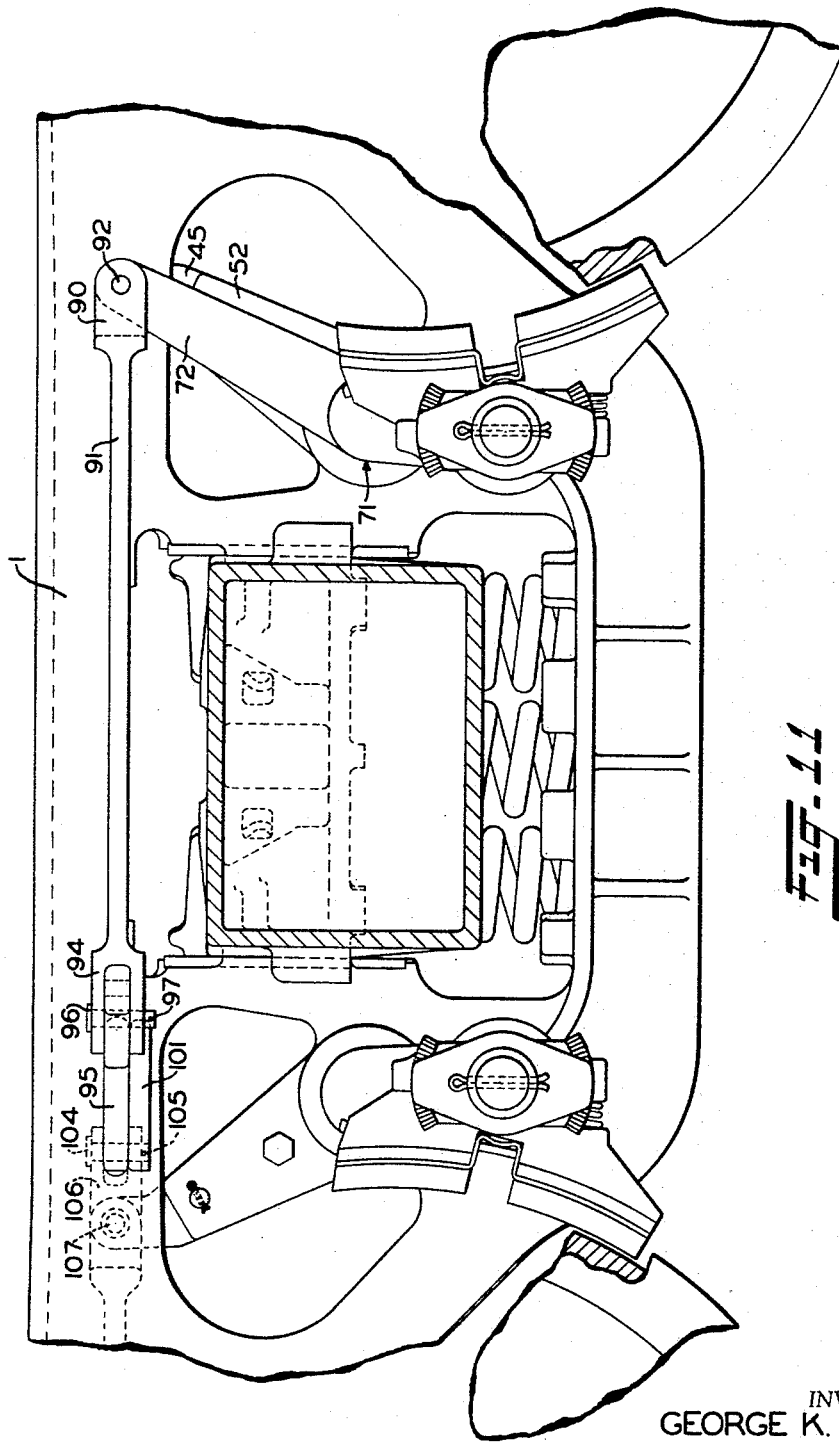
FIG. 11 is a partial elevational view of a railway car truck looking from a point inboard of the side frame outwardly, having a hand brake mechanism for applying a brake force to the two wheels associated with the side frame.
Figure 12:
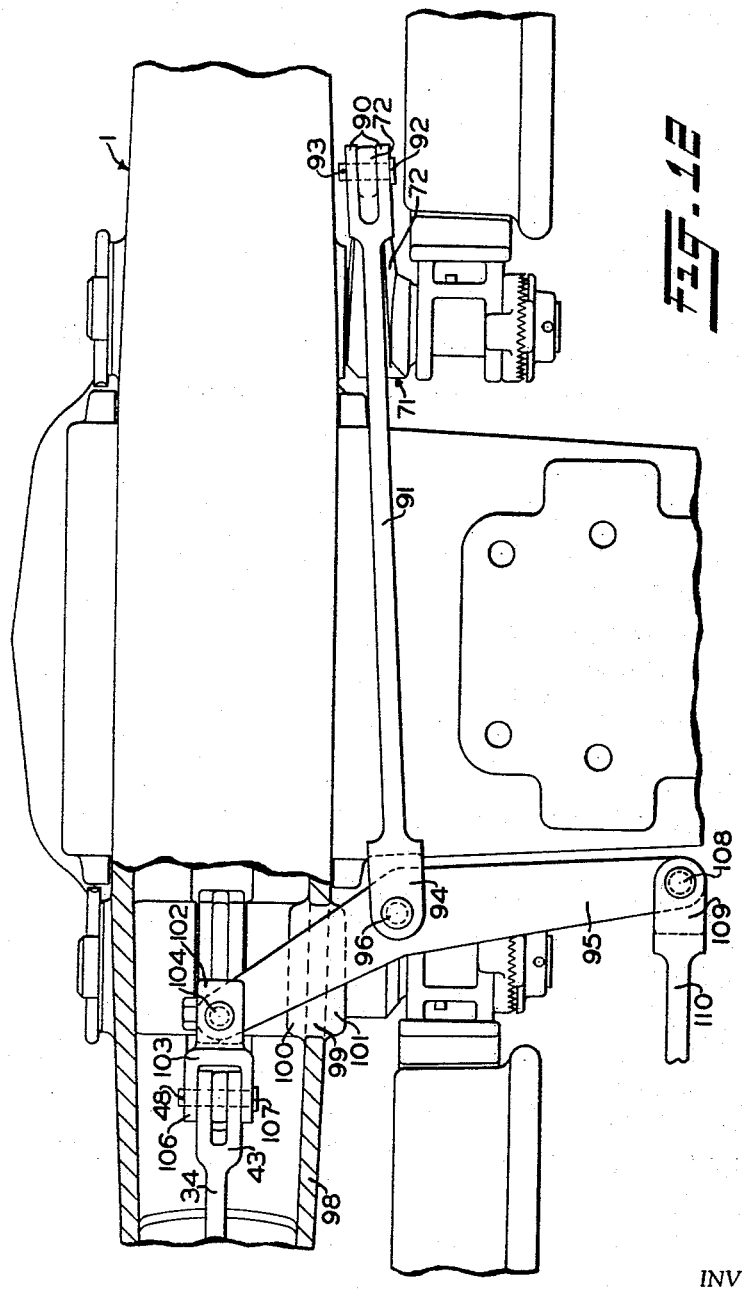
FIG. 12 is a plan or top view of a portion of the railway car truck and hand brake mechanism shown in FIG. 11.

In order to provide, in customary fashion, for operation of the brakes by hand brake means, a hand brake mechanism shown in FIGS. 11 and 12 is provided. As hereinbefore stated, the second brake head crank 71 is provided, as shown in FIGS. 11 and 12, with the hand brake lever arm 72, the outer end of which is disposed between the jaws of a clevis 90 formed at the right-hand end of a pull rod 91 and connected to the clevis 90 by a headed pin 92 and a cotter pin 93 (FIG. 12). As best shown in FIG. 12 of the drawings, the left-hand end of the pull rod 91 is provided with a clevis 94 between the jaws of which is disposed a floating lever 95 having two arms. A headed pin 96 extends through coaxial bores in the opposite jaws of the clevis 94 and a bore in the lever 95 intermediate the ends thereof to provide a pivotal connection between the pull rod 91 and the floating lever 95. A cotter pin 97, which appears only in FIG. 11 and extends through a bore adjacent the end of pin 96 opposite its headed end, prevents removal of this pin.

As shown in FIG. 12, a vertical side 98 of the side frame 1 is provided with a window or opening 99. At the bottom of the window 99 and extending respectively from the opposite faces of the vertical side 98 are a pair of oppositely extending ledges or floating lever supports 100 and 101 that are formed integral with the vertical side 98 of the side frame 1. As can be seen from FIG. 12, one arm of the floating lever 95 extends through the window 99 and is supported on the bottom thereof and on the supports 100 and 101. The end of this one arm of the lever 95 extends between the jaws of clevis 102 formed at one end of a short link 103 that is pivotally connected to the lever 95 by a headed pin 104 that extends through coaxial bores in the jaws of the clevis 102 and a bore formed in the one arm of the lever 95 adjacent the end thereof, and a cotter pin 105 (FIG. 11) that extends through a bore adjacent the end of pin 104 opposite its headed end to prevent removal of pin 104. The other end of the link 103 is provided with a second clevis 106 between the jaws of which, as best shown in FIG. 12, is disposed the jaws of the clevis 43 of the push rod 34. The two clevises 106 and 43 are pivotally connected by a headed pin 107 (FIG. 12) which it will be understood replaces the pin 46 shown in FIG. 1A which pin 46 is used on one side of a truck when the hand brake mechanism is connected to only the two wheels on the other side thereof. The cotter pin 48 shown in FIG. 2 for preventing removal of the pin 46 may extend through a bore adjacent the end of the pin 107 opposite its headed end to prevent removal of this pin 107.

As shown in FIG. 12 of the drawings, the other arm of the floating lever 95 extends inward toward the center of the car truck and is pivotally connected, as by means of a headed pin 108, to a clevis 109 at one end of a pull rod 110. If the hand brake mechanism is used to effect braking on only two wheels on one side of the truck, the pull rod 110 is connected by means of a cable or chain (not shown) to the usual hand brake wheel which is located at one end of a railway car.

If it is desired that the hand brake exert a braking force on all four wheels of the truck, it will be understood that each side of the truck is provided with the hand brake mechanism described above. The pull rods 110 of the two hand brake mechanisms are pivotally connected to the opposite ends of an equalizing lever (not shown) and the center of this equalizing lever is connected by means of a cable or chain (not shown) to the hand brake wheel at the one end of the car.

Operation

Let it be assumed that the pressure chamber 20 in the cup-shaped brake cylinder body 12 carried in each end of the two side frames 1 of a railway car truck is devoid of fluid under pressure, and that the springs 38 have moved the corresponding pistons 22 to the position shown in FIGS. 1A and 1B in which position the usual lugs on each packing cup 21 contact the left-hand end of the corresponding cup-shaped brake cylinder body 12.

In operation, when it is desired to effect a brake application, fluid under pressure is admitted to the pressure chamber 20 in each of the four brake cylinder bodies 12 on the truck through the corresponding passageway 19 and the pipe connecting this passageway to the brake control valve device of the usual air brake system on railway cars. Fluid under pressure thus applied to each chamber 20 formed between the corresponding piston 22 and the closed end of the body 12 is effective to move the piston 22 and push rod 34 against the yielding resistance of the spring 38. Since the operation of each brake cylinder device and its associated brake applying linkage is identical, only the operation of the brake cylinder device and linkage shown in FIG. 1A of the drawings will be described in detail.

As the piston 22 and push rod 34 move in the direction of the right-hand, the two-part brake cylinder lever comprising the members 44 and 45 is rocked clockwise, via the bearings 65 and 66 (FIG. 5) since the member 44 is splined to the shaft 63 by means of the internal splines 61 and external splines 62. Since the shaft 63 is an integral part of the brake head crank 64, as the shaft 63 is rotated in the bearings 65 and 66 in response to clockwise rocking of the two-part brake cylinder lever comprising members 44 and 45, it will be apparent from FIG. 1A that the brake shoe 88 and brake head 76, which are carried on the brake-head-carrying shaft 73 that is also an integral part of the brake head crank 64, are moved in the direction of the left-hand to bring the brake shoe 88 carried by the brake head 76 into braking contact with the tread surface of the corresponding wheel 10 to effect a braking action on the wheel 10.

The orientation of the brake head 76, inner plate member 77 and outer plate member 80 provided by serrated portions 78 and 79, stop lug 84 and spring 86 is such that the brake head 76 and brake shoe 88 carried thereby are moved substantially radially toward the wheel 10.

When it is desired to release the brake application, the fluid under pressure supplied to the chamber 20 is vented in the usual manner to atmosphere through the passageway 19 and corresponding pipe to the brake control valve device of the car brake system, whereupon the force of the spring 38 acting on the inturned flange 39 of the spring seat 40 is effective via annular member 37 to move the push rod 34 and, via this push rod, the piston 22 in a left-hand (FIG. 1A) or brake releasing direction to effect counterclockwise rocking of the two-part brake cylinder lever comprising members 44 and 45 to rotate the shaft 63 of the brake head crank 64 in the bearings 65 and 66. Accordingly, the brake head 76 and brake shoe 88 will be moved away from the tread surface of the wheel 10 to effect a brake release.

It will be noted that it is not necessary to use a slack adjuster with this type of brake rigging. It should be understood that the length of the bore in the body 12 is such as to provide sufficient travel for the piston 22, in addition to that required to effect contact of the brake shoes 88 with the tread surface of the wheels 10, that, as the brake shoes 88 wear away, the two-part brake cylinder levers are rocked through a greater angle so that the brake shoes are always properly moved into braking contact with the tread surface of the wheels of the truck during each brake application throughout their useful life without the necessity of a slack adjuster to compensate for wear of the shoes.

When a brake shoe 88 has completely worn out and must be replaced by a new brake shoe, a repairman will first remove the cotter pin 56 and thereafter the headed pin 55 (FIGS. 1A and 2). Subsequent to removal of the cotter pin 56 and headed pin 55, the repairman will exert a push or thrust on the crank end member 44 in a direction to rock the member 44 counterclockwise as viewed in FIG. 1A of the drawing. It will be apparent that this counterclockwise rocking of the member 44 is effective to move the brake head 76 and brake shoe 88 carried thereby in a direction away from the tread surface of the wheel 10. Accordingly, the repairman will rock the brake cylinder lever counterclockwise until the brake head 76 and brake shoe 88 carried thereby are in a position in which the brake shoe key 89 can be removed by means such as, for example, a hammer, thereby releasing the worn out brake shoe from the brake head 76. Thereafter, a new brake shoe can be secured to the brake head 76 by means of the key 89.

After a new brake shoe has been secured to the brake head 76, the repairman will rock the member 44 clockwise to the position shown in FIG. 1A so that the bores 53 (FIGS. 7, 8) in the arms 52 of the member 44 will be in alignment with the bore 49 (FIGS. 9, 10) in the member 45.

Next, the repairman will insert the headed pin 55 through the bores 53 and 49 and thereafter replace the cotter pin 56 in the bore adjacent the end of the pin 55 opposite the headed end thereof. Fluid under pressure can now be supplied to the chamber 20 to effect a brake application in the manner hereinbefore described in detail.

Description—FIG. 13

Shown in FIG. 13 of the drawings is a part of a railway car truck side frame 111 constructed in accordance with a second embodiment of the invention. According to this second embodiment of the invention, the side frame 111 differs from the side frame 1 shown in FIGS. 1A, 1B and 3 only in that the side frame 111 itself serves as the body of a brake cylinder device. While only one such brake cylinder device is shown in FIG. 13, it will be understood that each end of the side frame 111 is provided with such a brake cylinder device. Accordingly, like reference numerals have been used to designate the structure shown in FIG. 13 which is identical to that shown in FIGS. 1A to 12, inclusive. Only such features of the structure and operation of the embodiment of the invention shown in FIG. 13 which differ from that of the embodiment of FIGS. 1A to 12, inclusive, will be hereinafter described.

According to the embodiment of the invention disclosed in FIG. 13, extending inward from each end of the truck side frame 111 is a counterbore 112 the outer end of which is closed by a pressure head 113 that is secured to the end of the side frame 111 by a plurality of cap screws 114 only two of which appear in FIG. 13. The pressure head 113 has formed integral therewith a boss 115 that corresponds to the boss 18 shown in FIGS. 1A and 1B of the drawings. Extending through the boss 115 is a passageway 116 that opens at one end into the pressure chamber 20 formed between the pressure head 113 and the packing cup 21 that is secured to the piston 22 slidably disposed in the counterbore 112 in the side frame 111. The opposite end of the passageway 116 opens at a bolting face (not shown) on the boss 115 to which a flange fitting (not shown) may be secured as in the first embodiment of the invention. A pipe (not shown)

may have one end connected to this flange fitting and the opposite end connected to the brake cylinder passageway of the usual brake control valve device provided on railway cars for controlling the brakes thereon as explained in connection with the first embodiment of the invention.

The sleeve 25 that is formed integral with the piston 22 extends through an annular disc 117 to which is secured as, for example, by spot welding, an annular ferrule 118 which cooperates with the annular disc 117 to form an internal groove in which is disposed the dust excluding ring 26. The annular disc 117 is retained against a shoulder formed by the end of the counterbore 112 by a snap ring 119 inserted in a groove formed in the wall surface of this counterbore.

It will be understood that the operation of the brake cylinder device shown in FIG. 13 is identical to the operation of the brake cylinder devices shown in FIGS. 1A and 1B. Hence, a detailed description of the operation of the brake cylinder device shown in FIG. 13 is believed to be unnecessary.

*Description—FIG. 14*

In FIG. 14 of the drawings, a third embodiment of the invention is shown which is somewhat similar to that shown in FIGS. 1A and 1B but differs therefrom in that a cylindrical brake cylinder body 120 in which a piston 121 is slidably disposed is separate from a pressure head 122 which is secured to one end of a truck side frame 123 to clamp an out-turned flange 124 formed at one end of the cylinder body 120 between the pressure head 122 and the one end of the side frame 123 thereby to properly position the cylinder body 120 in an elongated cavity 125 formed in the one end of the side frame and corresponding to the cavity 5 shown in FIGS. 1A and 1B of the drawings. The brake cylinder body 120 may be made as a molded reinforced plastic element or be made from deep drawn steel by a pressing operation both of which provide an economical method of manufacture.

As shown in FIG. 14, in order to dampen shock and vibration of the brake cylinder body 120 an annular cushion member 126, somewhat wedgeshaped in cross section, is disposed in surrounding relation to a non-pressure end of the cylindrical brake cylinder body 120 opposite the one end having the out-turned flange 124 and interposed between body 120 and the interior wall surface of the elongated cavity 125 in the side frame 123.

The non-pressure end of the cylinder body 120 is provided, as shown in FIG. 14, with an inturned flange 127 through which extends one end of a sleeve 128 the opposite end of which is suitably secured to a boss 129 integral with the piston 121. Secured as, for example, by spot welding, to the left-hand side of the inturned flange 127 is an annular ferrule 130 which cooperates with the inturned flange 127 to form an internal groove in which is disposed a dust excluding ring 131 which may be of some suitable material such as, for example felt, to which a lubricant may be periodically applied.

Disposed within the sleeve 128 is an annular member 132 having on its left-hand side a knob 133 that rests against the boss 129 of the piston 121. The member 132 is provided with a peripheral annular groove in which is disposed a resilient O-ring 134 that corresponds to the O-ring 35 shown in the first embodiment of the invention. Integral with and extending from the righthand side of the member 132 is a push rod 135 that corresponds to the push rod 34 of the previous embodiments of the invention in that intermediate its ends and integral therewith this push rod is provided with a second annular member 136 against which rests one end of a brake cylinder release spring 137.

Except as explained above, it will be understood that the construction and operation of the brake cylinder device shown in FIG. 14 is identical to the brake cylinder device shown in FIGS. 1A and 1B. Accordingly, it is believed that a detailed description of the operation of the brake cylinder device shown in FIG. 14 is unnecessary.

Having now described the invention, what I claim as new and desire to secure by Letters Patent is:

1. A fluid pressure brake apparatus for a railway car truck having a plurality of wheels, said apparatus comprising:
    (a) a truck side frame member having at one end a hollow cylindrical portion,
    (b) a pressure head secured to the one end of said truck side frame member to provide in said cylindrical portion brake cylinder means,
    (c) piston means operable in the brake cylinder means,
    (d) a release spring interposed between said truck side frame member and said piston means for normally biasing said piston means to release position,
    (e) a braking element for one wheel of the railway car truck, and
    (f) a crank member pivotally mounted on said truck side frame member, said crank member being operably connected to said piston means and to said braking element and actuable against the yielding resistance of said release spring in response to a fluid pressure force effective on said piston means to effect the application of said braking element to the tread surface of the one wheel of the railway car truck to exert a braking force thereon.

2. A fluid pressure brake apparatus for a railway car truck having a plurality of wheels, said apparatus comprising:
    (a) a truck side frame member having at each of its opposite ends a hollow cylindrical portion,
    (b) a pair of pressure heads secured respectively to opposite ends of said truck side frame member to provide in each of said hollow cylindrical portions brake cylinder means,
    (c) piston means operable in each of said brake cylinder means,
    (d) a pair of release springs each interposed between said truck side frame member and one of said piston means for normally biasing the respective piston means to a release position,
    (e) a plurality of braking elements, one for each of the two wheels of the railway car truck that are disposed adjacent the respective opposite ends of said truck side frame member, and
    (f) a pair of crank members each pivotally mounted on said truck side frame member, each of said crank members being operably connected to one of said piston means and to one of said braking elements and actuable against the yielding resistance of a corresponding one of said release springs in response to a fluid pressure force effective on the corresponding one of said piston means to effect the application of a corresponding braking element to the tread surface of one of said two wheels to exert a braking force thereon.

3. A fluid pressure brake apparatus for a railway car truck, as claimed in claim 1, further characterized by linkage means operably connected to said crank member for applying a manual force thereto to effect a brake application on the car wheels independently of fluid pressure force on the piston means.

4. A fluid pressure brake apparatus for a railway car truck, as claimed in claim 2, further characterized by linkage means operably connected to both of said pair of crank members for applying a manual force thereto to effect a brake application on each of said two wheels independently of fluid pressure force on said piston means.

5. A fluid pressure brake apparatus for a railway car truck, as claimed in claim 1, further characterized in that said pressure head has formed integral therewith a hollow cylindrical extension that is received in the hollow cylindrical portion of said truck side frame which extension in cooperation with said pressure head constitutes a brake cylinder means, and in that said piston means is operable in said extension.

6. A fluid pressure brake apparatus for a railway car truck, as claimed in claim 1, further characterized in that said cylindrical portion at said one end of said truck side frame member has a bore therein, and in that said piston means is slidably operable in said bore whereby said piston means in cooperation with said cylindrical portion constitutes a fluid pressure brake cylinder device.

7. A fluid pressure brake apparatus for a railway car truck, as claimed in claim 1, further characterized in that said piston means comprises a piston having a hollow cylindrical extension integral therewith and extending from one side thereof, and by a linkage operably connecting said crank member to said piston, said linkage including a rockable lever and a rod at one end pivotally connected to said lever and having its opposite end extending into said extension.

8. A fluid pressure brake apparatus for a railway car truck having a plurality of wheels, said apparatus comprising:
 (a) a truck side frame member having at each end a hollow cylindrical portion and a pair of parallel spaced-apart side walls extending between said hollow cylindrical portions,
 (b) a pressure head secured to each end of said truck side frame member to provide in the corresponding hollow cylindrical portion brake cylinder means,
 (c) piston means slidably operable in each brake cylinder means,
 (a) a pair of release springs each interposed between said truck side frame member and a corresponding piston means for normally biasing it to a release position,
 (e) a pair of braking elements, one for each of the pair of wheels of the railway car truck that are disposed adjacent the respective opposite ends of said truck side frame member, and
 (f) a pair of linkages disposed between said spaced-apart side walls of said side frame member, each linkage being operatively connected to the piston means in one brake cylinder means and to one of said braking elements and including a crank member rockably mounted in said side walls of said truck side frame member.

9. A fluid pressure brake apparatus for a railway car truck, as claimed in claim 1, further characterized by a hollow molded plastic cylinder disposed in the hollow cylindrical portion of said truck side frame and having at one end an out-turned flange disposed between said pressure head and the one end of said side frame whereby said pressure head and said hollow moulded plastic cylinder cooperate to provide a brake cylinder means in which said piston means is slidably operable.

10. A fluid pressure brake apparatus for a railway car truck, as claimed in claim 7, further characterized in that said rockable lever constitutes two members normally joined together to constitute a rigid element and separable to provide relative angular movement with respect to each other, one of said members being pivotally connected to said rod and the other being connected to said crank member, whereby upon separation of said two members, angular movement of said other member with respect to said one member effects rotation of said crank members.

References Cited
UNITED STATES PATENTS

| | | | |
|---|---|---|---|
| 1,148,026 | 7/1915 | Kroegher | 188—153 |
| 2,237,509 | 4/1941 | Tack | 188—153 X |

DUANE A. REGER, *Primary Examiner.*